United States Patent
Kojima et al.

[15] 3,696,909
[45] Oct. 10, 1972

[54] DRIVING MECHANISMS FOR MOVING STAIRWAYS

[72] Inventors: Mikiharu Kojima, Tokyo; Tetuo Iwata, Kanagawa-ken, both of Japan

[73] Assignee: Tokyo Shibaura Electric Co., Ltd., Kawasaki-shi, Japan

[22] Filed: Dec. 8, 1970

[21] Appl. No.: 96,219

[30] Foreign Application Priority Data

Dec. 10, 1969  Japan .................... 44/116716
Jan. 20, 1970  Japan ........................ 45/5513

[52] U.S. Cl. ............................................... 198/16
[51] Int. Cl. .............................................. B65g 9/12
[58] Field of Search ................... 198/16, 17, 18, 203

[56] References Cited

UNITED STATES PATENTS 2,929,483  3/1960  Jin .............................. 198/16
2,753,980  7/1956  Ballard ...................... 198/203
3,050,178  8/1962  Stone ......................... 198/203

*Primary Examiner*—Richard E. Aegerter
*Attorney*—Kemon, Palmer & Estabrook

[57] ABSTRACT

In a driving mechanism for a moving stairway including moving hand rails and moving steps along a truss, there are driving wheels for driving the hand rails and sprocket wheels for driving the steps on a common driven shaft mounted on the truss.

The wheels and sprockets are rotated at the same speed as the shaft causing the moving hand rails and moving steps to be driven in synchronization. Those parts of the surface of the shaft disposed near its both ends are carried on bearing to provide a sufficient clearance between said both ends and the inner walls of the trusses facing said ends, thereby permitting easy fitting and detachment of the endless moving hand rail.

4 Claims, 4 Drawing Figures

DRIVING MECHANISMS FOR MOVING STAIRWAYS

This invention relates to a driving mechanism for moving stairways, particularly moving stairways having transparent balustrades.

In a prior art moving stairway having opaque balustrades, there are provided wheels for driving the moving hand rails at either the upper or lower end, whereas in a moving stairway having transparent balustrades the driving wheels are disposed in a truss beneath the balustrades so as to conceal driving wheels. In any case, the wheels for driving the hand rails and sprocket wheels for driving steps are mounted on independent shafts, and each of these shafts is driven by a sprocket wheel and a chain so that the construction of the driving mechanism for the moving stairway is complicated thus increasing the labor and cost of assembly, maintenance and inspection of the moving stairway.

Further, each shaft has both ends supported on the bearings fitted in the members attached to both inner walls of a truss or those of a pair of balustrades. Accordingly, when the moving hand rails have to be detached from or fitted to the balustrades in a cut or endless state for the maintenance, inspection or repair of the moving stairways or the replacement of said rails, it is necessary to take out the bearing from said side members and allow a sufficient space between the shaft and the truss or paired balustrades to pass the endless moving hand rail therethrough, requiring much time and work.

One of the prior methods of fitting a moving hand rail does consist in using an endless form from the start, but fitting a one-piece form thereof to a balustrade by passing it around the wheels for its drive or guide rollers, thermally bonding both ends of said one-piece rail which has been vulcanized in advance, thereby finishing it in an endless form. With this method, however, should said bonding be carried out imperfectly, the rail will break at the joint, most likely leading to the danger of a serious accident occurring particularly during the operation of a moving stairway.

It is an object of this invention to provide an improved driving mechanism for a moving stairway of simple construction which is easy to fabricate, maintain, inspect and repair and can safely drive the moving stairway by fitting wheels for driving a moving hand rail and sprockets for driving steps in coaxial relationship.

Another object of this invention is to provide a driving mechanism for a moving stairway wherein the endless moving hand rails can be readily mounted on balustrades without the necessity of removing or partially disassembling supporting means of the hand rails.

According to this invention there is provided a driving mechanism for a moving stairway including trusses, moving hand rails and moving steps which are moved along the trusses; the mechanism comprising a shaft driven by a power unit, driving wheels for driving the moving hand rails, sprocket wheels for driving the steps, said driving wheels and sprocket wheels being commonly mounted on the shaft and means for mounting the shaft on the trusses. There are formed spaces between the inner sides of trusses and the supporting means of the shaft through which the moving hand rails can be mounted and dismounted.

The invention can be more fully understood from the following description when taken in conjunction with the accompanying drawings, in which.

Figure 1:
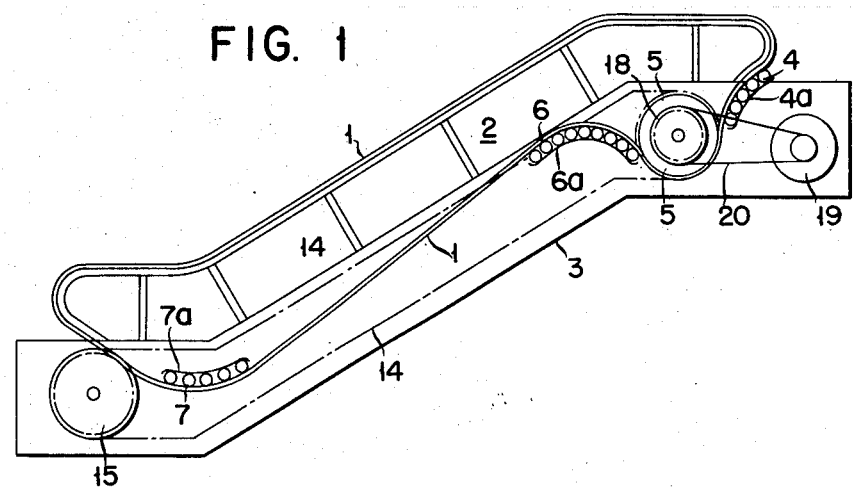
FIG. 1 shows a side elevation of a moving stairway using the driving mechanism.
Figure 2:
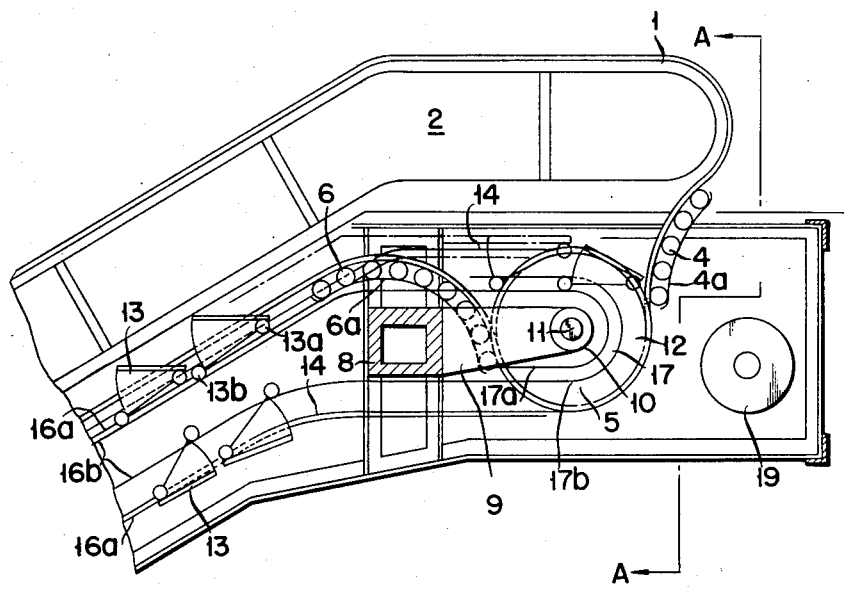
FIG. 2 is an enlarged view, partly in section, of the upper end of the moving stairway shown in FIG. 1.
Figure 3:
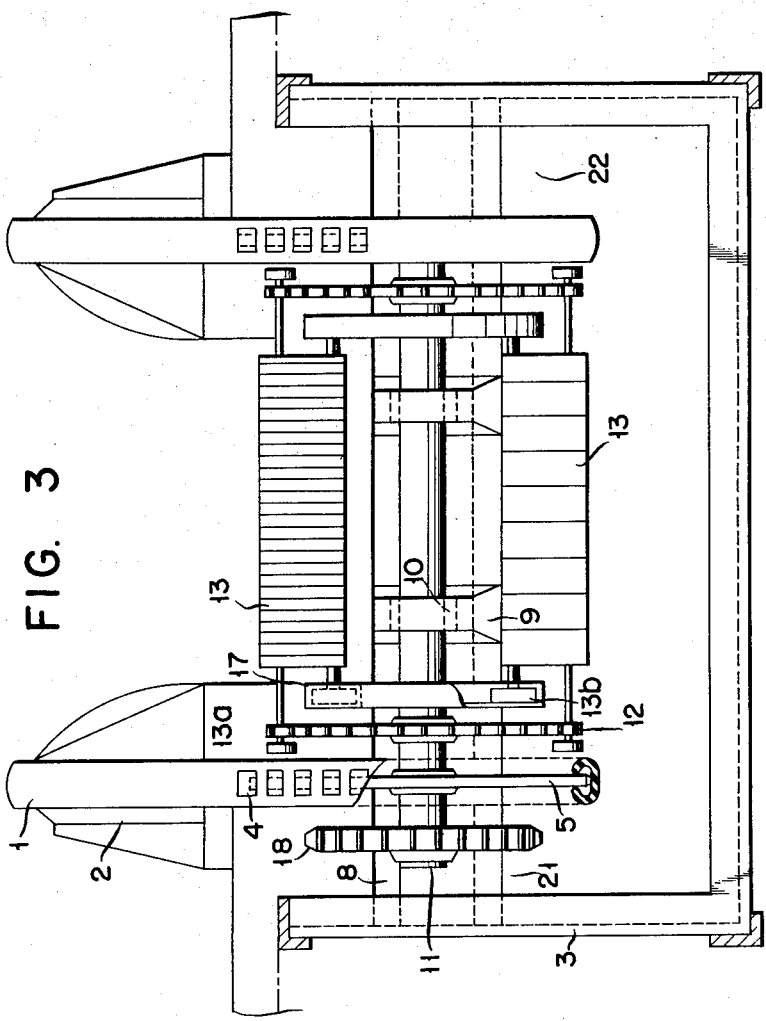
FIG. 3 is a sectional view taken along a line A—A in FIG. 2, portions of steps being removed to clearly show the driving mechanism.

With reference now to the accompanying drawings, in FIGS. 1 to 3 there is shown a moving stairway comprising a pair of balustrades 2, a pair of moving hand rails 1 guided by the balustrades, a train of steps 13, a truss 3 and a mechanism contained in a truss 3 for driving moving hand rails 1 and steps 13. Each of the moving hand rails 1 is formed in an endless belt and guided by the balustrade 2 along the periphery thereof. The lower run of each hand rail 1 passes through the truss 3 or a frame.

The upper end of the hand rail 1 is conducted to the guide rollers 4 and then pressed against the periphery of the wheel 5 for driving said rail 1. Further, the rail 1 is made to contact the wheel surface over a considerable length by means of the rollers 6 to produce a strong friction between the rail 1 and wheel 5, so that the rail 1 can be driven without any slip.

At the lower end of the balustrade 2, each rail 1 is guided into truss 3 by guide rollers 7 whereby the rail is tensioned between guide rollers 6 and 7. Ordinarily, rollers 4, 6 and 7 are retained in their positions by retainers 4a, 6a and 7a, respectively.

As shown in FIGS. 2 and 3, a supporting frame 8 is provided beneath moving hand rails 1 and guide rollers 6, the opposite ends of frame 8 being secured to the truss 3 to form a portion thereof. Frame 8 carries substantially horizontal supporting arms 9 having bearings 10 at their outer ends to rotatably support a shaft 11 for driving the stairway. Advantageously, shaft 11 is supported by bearings 10 at two intermediate points spaced from the opposite ends of shaft 11 rather than at the opposite ends. Supporting frame 8, arms 9 and bearings 10 cooperate to constitute supporting means for shaft 11.

Driving wheels 5 are mounted upon the opposite ends of shaft 11 to drive endless moving hand rails 1 having a C shaped cross-section, as shown in FIG. 3.

Generally, each driving wheel 5 takes the form of a circular disc for driving hand rail 1 by the frictional force therebetween.

On the peripheral surface of the wheel 5 maybe arranged a plurality of teeth at an equal pitch, and in the inner wall of the hand rail 1 are formed a series of lateral grooves or slots at the same pitch as said teeth, thereby enabling the rail 1 to be reliably driven by the wheel if a frictional force alone does not fully serve the purpose.

Sprocket wheels 12 are secured to shaft 11 close to and on the inside of driving wheels 5 for driving steps 13 through step driving chains 14 (for simplicity depicted by continuous lines).

First followers 13a of steps 13 are connected by chains 14 which mesh with the teeth of driving sprocket wheels 12 and the teeth of idler sprocket wheels 15 at the lower end of the truss 3, and are guided by guide rails 16a. Second followers 13b of steps 13 are guided by guide rails 16b which are usually independent of guide rails 16a.

As shown in FIGS. 2 and 3, guide members 17 are provided to sandwich second followers 13b between inside and outside guide ways 17a, 17b, for guiding the same to revolve about shaft 11. The upper part of the inside guide ways 17a and the lower part of the outside guide ways 17b are connected to guide rails 16b respectively.

A sprocket wheel 18 is secured to one end of shaft 11 to drive it by an electric motor 19 or other suitable power unit through a chain 20.

Space 21 between an inside wall of the truss 3 and sprocket 18 and space 22 between the other inside wall of the truss 3 and the driving wheel 5 on that side are formed to allow the moving hand rails 1 to pass therebetween and will be described later.

When sprocket 18 is driven by motor 19 through chain 20, shaft 11, driving wheels 5 and sprocket wheels 12 mounted on shaft 11 rotate at the same speed to drive moving hand rails 1 and step 13 in the same direction at the same speed.

As above described, moving hand rails 1 are urged against the periphery of driving wheels 5 by guide rollers 4 and 6 and are moved positively by rolling contact or meshing contact without any slip.

This arrangement of driving both hand rails 1 and steps 13 with a single shaft greatly simplifies the construction of the driving mechanism for the moving stairway, thus minimizing the occurrence of failure, facilitating maintenance, inspection and repair and reducing manufacturing cost.

Space 21 and space 22 shown in FIG. 3 are used to mount or dismount the endless moving hand rails 1 on or from driving wheels 5 and balustrades 2.

In this case, there is no need for the shaft 11 to be dismembered or taken out of the truss. Nor is it necessary to use a one-piece form of rail 1 in fitting or cut it for removal. The chain 20 for driving the driven sprocket 18 has only to be disengaged therefrom. In this manner, maintenance, inspection and repair of the moving stairway, particularly its driving mechanism and component parts associated therewith or replacement of the moving hand rails can be facilitated.

Figure 4:
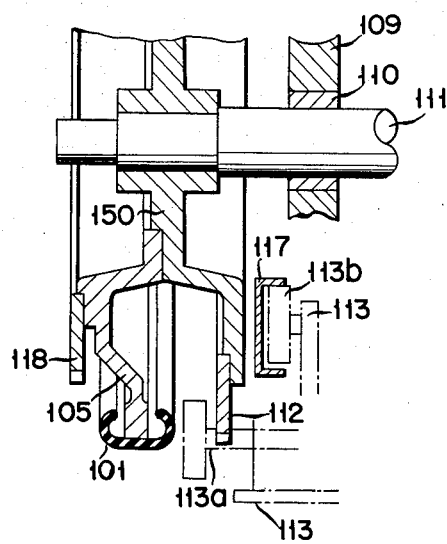
FIG. 4 is a partial sectional view of a modified driving mechanism.

FIG. 4 shows a portion of another embodiment of this invention wherein portions corresponding to those shown in FIG. 3 are designated by the same reference numerals plus one hundred.

As shown, driving wheels 105 for moving hand rails 101 and sprockets 112 for driving steps are coaxially mounted on common wheels 150 which are secured on the opposite ends of shaft 11, and a sprocket wheel 118 driven by motor 19 through chain 20 (as shown in FIG. 3) is secured to the shaft. Thus the power unit 19 enables the driving wheels 105 and sprocket 112 to be integrally rotated in coaxial relationship, not only rendering the driving means for the shaft 11 of simple construction, compact and easy to handle, but also decreasing manufacturing cost.

What we claim is:

1. A driving mechanism for a moving stairway including a longitudinally extending truss having a pair of inner walls arranged in spaced parallel relationship with one another, an endless train of moving steps positioned between said inner walls of said truss, a pair of spaced parallel balustrades supported by said truss and a pair of endless hand rails running on said balustrades, said driving mechanism comprising:

a shaft transversely disposed between said inner walls, a pair of driving wheels each mounted on one end of said shaft for driving each of said endless hand rails, said shaft having the ends thereof terminating in spaced relation to said inner walls to provide clearances between said inner walls and said shaft ends through which said endless hand rails may be moved in mounting and dismounting said endless hand rails on said driving wheels in an endless state;

a pair of sprocket wheels rigidly mounted on said shaft between said hand rail driving wheels to drive said endless train of moving steps;

bearing means disposed between said hand rail driving wheels to support said shaft; and power supply means for rotating said shaft.

2. The driving mechanism according to claim 1 wherein said bearing means is disposed between said sprocket wheels.

3. The driving mechanism according to claim 1 further comprising frame means transversely passing through the endless train of moving steps and connected at both ends with said truss, and supporting means fixed at one end thereof to said frame means and supporting said bearing means at the other end, said supporting means extending lengthwise of said truss between said hand rail driving wheels.

4. The driving mechanism according to claim 1 wherein said hand rail driving wheels and said sprocket wheels adjacent thereto are combined respectively to form a substantially integral structure.

* * * * *